(12) United States Patent
Diels et al.

(10) Patent No.: US 8,929,408 B1
(45) Date of Patent: Jan. 6, 2015

(54) MULTI COMB GENERATION WITH A MODE LOCKED LASER CAVITY

(71) Applicant: STC.UNM, Albuquerque, NM (US)

(72) Inventors: Jean-Claude Diels, Albuquerque, NM (US); Ladan Arissian, Albuquerque, NM (US); Koji Masuda, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 13/747,316

(22) Filed: Jan. 22, 2013

Related U.S. Application Data (60) Provisional application No. 61/589,747, filed on Jan. 23, 2012.

(51) Int. Cl.
*H01S 3/098* (2006.01)
*H01S 3/106* (2006.01)

(52) U.S. Cl.
CPC .................... *H01S 3/1062* (2013.01)
USPC .................. 372/18; 372/25; 372/99; 372/98; 372/97

(58) Field of Classification Search
USPC .................... 372/18, 25, 99, 98, 97
See application file for complete search history.

(56) References Cited

U.S. PATENT DOCUMENTS

| | | | | |
|---|---|---|---|---|
| 2003/0174743 A1* | 9/2003 | Cliche et al. | | 372/20 |
| 2006/0187537 A1* | 8/2006 | Huber et al. | | 359/337.22 |
| 2006/0280219 A1* | 12/2006 | Shchegrov | | 372/99 |
| 2012/0162662 A1* | 6/2012 | Johnson et al. | | 356/496 |

* cited by examiner

*Primary Examiner* — Kinam Park
(74) *Attorney, Agent, or Firm* — Schwegman Lundberg & Woessner, P.A.

(57) ABSTRACT

Apparatus, systems, and methods of generating multi combs can be used in a variety of applications. In various embodiments, an etalon can be disposed in the laser cavity of a mode-locked laser to adjust frequency combs. Additional apparatus, systems, and methods are disclosed.

24 Claims, 4 Drawing Sheets

MULTI COMB GENERATION WITH A MODE LOCKED LASER CAVITY

RELATED APPLICATION

This application claims priority under 35 U.S.C. 119(e) from U.S. Provisional Application Ser. No. 61/589,747, filed 23 Jan. 2012, which application is incorporated herein by reference in its entirety.

GOVERNMENT INTEREST STATEMENT

This invention was made with U.S. Government support under grant number ECS0925526 awarded by the National Science Foundation (NSF). The United States Government has certain rights to the invention.

FIELD OF THE INVENTION

The invention relates generally to frequency combs and to systems and devices for the generation and/or use of the same.

BACKGROUND

An optical frequency comb is an optical spectrum of equidistant lines. The use of frequency combs as a tool may depend on the spacing between teeth (lines) of the comb. Mode-locked lasers can provide accurate frequency combs. A mode-locked laser produces a stream of identical pulses, which can have a duration of only several femtoseconds, at a repetition rate typically in the range of 70 to 150 MHz. In the frequency domain, the laser output consists of a frequency comb having equidistant lines. Because these lines are exactly equally spaced, this frequency comb can be used as a ruler for optical frequencies. Given an atomic line (frequency standard) as reference, this ruler can be used, in principle, to determine with absolute accuracy and high precision the optical frequency of any optical source, by comparing (beating) the frequency of that source with the closest line of the ruler, and counting the teeth (lines) of the comb that span the difference between the frequency standard and the unknown source. For this type of measurement to be practical, there should be line indicators ("tickmarks") spaced by much more than the typical 100 MHz of a Ti:sapphire mode locked laser, similar to a ruler for length measurements, for example, in which there are different tickmarks for 1 mm, 1 cm, 10 cm, and 1 m. The need for such instrumentation having tickmarks ranges from measurements of atomic lines and physical constants to accurate monitoring of spectral lines in astronomy.

There have been various attempts to increase tooth spacing. In the articles "Fabry-Perot filter cavities for wide-spaced frequency combs with large spectral bandwidth;" T. Steinmetz, T. Wilken, C. Araujo-Hauck, R. Holzwarth, T. W. Hansch, and T. Udem; *Applied Physics B: Lasers and Optics*, 96:251-256, 2009 and "Multiplying the repetition rate of passive mode-locked femtosecond lasers by an intracavity flat surface with low reflectivity;" T. M. Liu, F. X. Kartner, J. G. Fujimoto, and C. K. Sun. *Optics letters*, 30:439-441, 2005, a proposed method to increase tooth spacing has included the use of a Fabry-Perot cavity to multiplex the pulse train from a mode-locked laser. The shortcomings of this method are threefold. First, because the device is passive, the average power is reduced. Additional amplification may be required. Second, because of the unavoidable cavity dispersion, the unequal spacing of the Fabry-Perot modes defeats the purpose of a comb of absolute accuracy. Even when the cavity is in vacuum, there will be dispersion due to the mirror coatings. Finally, matching the carrier-to envelope offset (CEO) of the driving laser and slave cavity requires sophisticated stabilization methods. The CEO is the tooth frequency of the (extended) comb closest to zero frequency. Equivalently, it is also the change in carrier phase (with respect to the envelope) from pulse to pulse, divided by the time between two successive pulses. The CEO is an important parameter of pulse trains related to the change in phase from pulse to pulse in the train.

Another approach has included the use of the properties of the mode-locked laser in making combs of perfect spacing by combining a driving laser with a slave laser, (rather than passive) cavity. In another approach as discussed in the article by Liu et al. mentioned above, the insertion of a low reflectivity (4%) interface inside a mode-locked laser cavity to multiplex its repetition rate has been proposed. However, such an approach may be difficult, as the alignment of the reflecting face is extremely critical (it has to be perfectly parallel to the output coupler), and its position has to be located at an exact fraction of the cavity length.

BRIEF DESCRIPTION OF THE FIGURES

Embodiments of the invention are illustrated by way of example and not limitation in the figures of the accompanying drawings in which.

DESCRIPTION

The following detailed description refers to the accompanying drawings that show, by way of illustration and not limitation, various example embodiments of the invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, measurement line indicators, herein referred to as tickmarks, are provided in a controllable fashion. In an implementation, the tickmarks are a multiple of the frequency spacing of the teeth of the original comb. In another implementation, the tickmarks have a common multiple with those of the original comb, thereby providing accurate reading over a broader frequency range, as is done with a Vernier caliper in distance measurements. Such tickmarks may be provided by placing a repetition rate multiplier into a mode-locked laser cavity.

Figure 1:
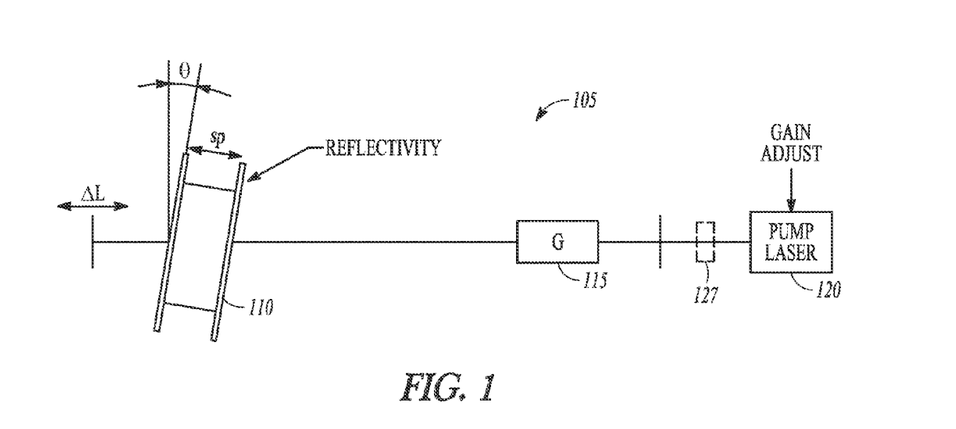
FIG. 1 shows a block diagram of an example embodiment of a laser cavity with an intracavity etalon.

FIG. 1 shows a block diagram of an example embodiment of a laser cavity 105 having a gain medium 115 with an intracavity etalon 110 inserted in laser cavity 105. The control parameters for providing tickmarks can include the spacing, sp, of etalon 110, a tilt angle θ with respect to a perpendicular axis to a propagation path (propagation axis) in laser cavity 105, a cavity elongation ΔL, and a gain control through the pump power. The gain control through the pump power can be adjusted either through the pump power from pump laser 120 itself, through an electro-optic attenuator 127, or both through the pump power from pump laser 120 and electro-optic attenuator 127. The use of electro-optic attenuator 127 may be optional. Spacing, sp, can be controlled by inserting an etalon of a selected thickness between its parallel reflecting surfaces. The selection of the thickness may depend on the application. With an etalon consisting of parallel reflecting surfaces separated by air, the spacing may be controlled by a drive, for instance a piezoelectric element, that moves the parallel reflecting surfaces to a selected spacing. The tilt angle θ can be adjusted by a drive that moves or rotates etalon 110 to a selected angle. The cavity elongation ΔL can be adjusted by a drive that moves one or more of the mirrors of laser cavity 110. Each of such drives may be independently controlled by separate control units, a single control unit, or variations thereof. A single control unit may be used to control all components of the laser that includes laser cavity 105 having gain medium 115 with intracavity etalon 110 inserted in laser cavity 105.

A Fabry-Perot etalon (FPE) can be inserted into a mode-locked laser cavity, where the FPE functions as a repetition rate multiplier. For example, an uncoated fused-silica FPE can be inserted into a standard titanium-sapphire mode-locked laser cavity. Using a 15 mm thick FPE etalon in such a titanium-sapphire mode-locked laser cavity, the output of the laser can consist of bursts of 15 pulses at around 6.8 GHz, repeating at the cavity round-trip frequency of 256 MHz. In the frequency domain, there is a 6.8 GHz frequency comb, with a set of sidebands, which can be referred to as a bunch of sidebands, around each tooth of the comb, separated by 256 MHz. The theoretical modeling of the frequency structure of this intertwined comb is rather complex, which is discussed below.

There are numerous controls that can be applied to control the parameters of the intertwined comb of a laser cavity operable as a mode-locked laser cavity with an intracavity etalon. The wavelength of the laser can be controlled by the Fabry-Perot etalon, where the combs of modes translate uniformly with the angle of the Fabry-Perot etalon. The high frequency of the mode-locked laser can be finely and continuously tuned by tilting the Fabry-Perot etalon. For example, the high frequency of 6.8 GHz, provided by the abovementioned titanium-sapphire mode-locked laser, can be finely and continuously tuned by tilting the Fabry-Perot etalon. Coarse tuning of the high frequency can be provided by the Fabry-Perot etalon thickness.

Tilting the Fabry-Perot etalon can result in a tuning of the laser repetition rate (sideband spacing). Another control mechanism can be provided by the laser gain, where the sideband spacing (laser original repetition rate) can be tuned by adjusting the laser gain. Coarse tuning of the sideband spacing can be provided by the laser cavity length. Another control mechanism can be provided by controlling the number of pulses in the high frequency burst, where the number of pulses in the high frequency burst can be adjusted through the reflectivity of the faces of the Fabry-Perot etalon.

There is a "carrier to envelope offset" (CEO) associated with the repeating burst. The center of gravity of the successive bunches of pulse (in time) moves from bunch to bunch with respect to the Fabry-Perot etalon modes. This can be finely tuned by adjusting the Fabry-Perot angle, the gain, or both.

These control mechanisms or "control knobs" can make for a frequency comb of unique flexibility. These control knobs may provide the capability to reach high frequency comb spacing that was thought to be only achievable with ultra short laser cavities.

Figure 2:
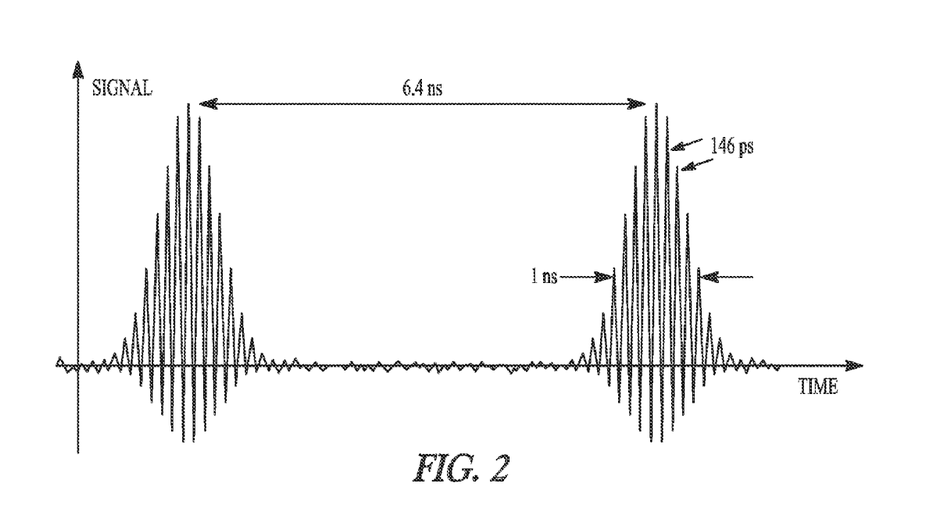
FIG. 2 shows a temporal profile of a pulse train recorded with a fast photodetector and an 8 GHz oscilloscope.
Figure 3A:
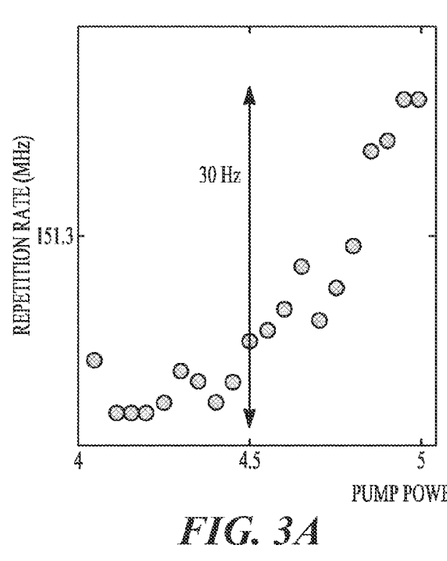
FIGS. 3A-3B show dependence of the repetition rate on the pump intensity without an intracavity etalon and with an intracavity etalon.
Figure 3B:
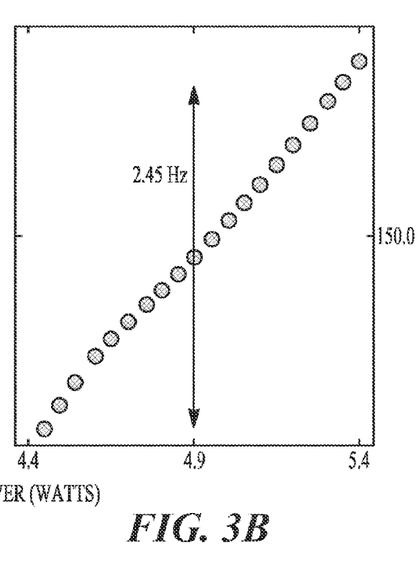

The pulse train and frequency comb generated from a laser such as shown in FIG. 1 have very unique features. With a reflection coefficient of only 4% per face, one would not expect that a pulse train is generated. However, as the rapidly decaying bunch created by a first pulse cycles through the cavity, the energy of the first pulse is progressively transferred to the following pulse, while the gain condition of the laser maintains the energy in the bunch constant. The continuous energy transfer from the pulses at the leading part of the bunch to the trailing part results in a slowing down of the group velocity of the bunch envelope. Computer simulation confirms indeed that a symmetric bunch of pulses is formed, with a reduced group velocity, in agreement with the measurement of FIG. 2 with respect to the uncoated fused-silica FPE inserted into the standard titanium-sapphire mode-locked laser cavity. FIG. 2 shows a temporal profile of a pulse train recorded with a fast photodetector and an 8 GHz oscilloscope. The detection cannot time resolve the ultra-short laser pulses. Gain dynamics has the effect of speeding up the bunch of pulses, by providing gain to the leading part, at the expense of the trailing part (saturated gain). As a result, the repetition rate of the bunch has a gain dependence that is enhanced as compared to that without an intracavity etalon as indicated in FIGS. 3A and 3B. FIG. 3A shows dependence of the repetition rate on the pump intensity without an intracavity etalon. FIG. 3B shows dependence of the repetition rate on the pump intensity with an intracavity etalon.

Due to the difference between the pulse bunch velocity and the group velocity, a radio frequency (rf) spectrum of the pulse train shows an unusual offset frequency, which is analogous to the well known carrier-to-envelope offset frequency of usual frequency combs. This offset frequency is present not only in the base-modes but also in the second order modes, whose positions are given by an integer multiple of the repetition rate plus the offset frequency.

There are several features that arise from the dependence of the optical frequency and repetition rate on the tilt of the Fabry-Perot etalon. Consider FIG. 4 that shows light incident at Fabry-Perot etalon 410 having a thickness d, where Fabry-Perot etalon 410 can be inserted in the laser cavity of FIG. 1. The light is incident at point a having an internal angle, θ, with transmission $T_0$ from point b with angle $θ_0$. The transmission at point a corresponds to the incident light and transmission $T_1$ from point c corresponds to transmission from Fabry-Perot etalon 410 after two reflections within Fabry-Perot etalon 410.

Figure 4:
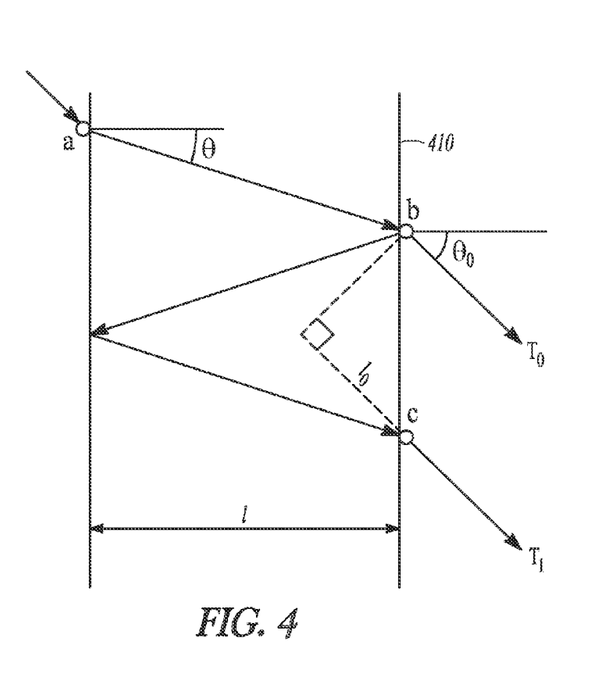
FIG. 4 shows light incident at a Fabry-Perot etalon.

With respect to the following discussions considering Fabry-Perot cavity 410 inserted in the laser cavity of FIG. 1, $n_{fpp}$ is the phase index of Fabry-Perot cavity 410, $n_{fpg}$ is the group index of Fabry-Perot cavity 410, $n_{phase}$ is the phase index averaged over the whole laser cavity in which Fabry-Perot cavity 410 is inserted, and $n_g$ is the group index averaged over the whole laser cavity. Fabry-Perot cavity 410 sets the k-vector of the light through the resonance condition:

$$2knd \cos θ = 2Nπ, \quad (1)$$

where n is an index of refraction of the material of Fabry-Perot cavity 410 and N is an integer. This relationship relates the k-vector to the index, n, and thickness, d, according to $$k=(N\pi)/(nd\cos\theta), \quad (2)$$

which implies that the optical frequency is:

$$\omega=(cN\pi)/(nd\cos\theta). \quad (3)$$

The resonance condition of the laser cavity, which can be referred to as the big laser cavity since it includes the inserted Fabry-Perot cavity 410, is the condition that there should be an integer number of wavelengths in the big laser cavity:

$$M\lambda=M\lambda_0/n_{phase}=2L, \text{ or}$$

$$M\times(2\pi c/n_{phase}\omega)=2L \text{ or}$$

$$(2n_{phase}L\omega)/c=2M\pi=\omega\tau_{phase}, \quad (4)$$

where $\lambda_0/n_{phase}$ is the average wavelength in the cavity, that is, the vacuum wavelength divided by the phase index, averaged over the cavity length. As the frequency of the laser is imposed with the Fabry-Perot, the parameter that changes to keep the big cavity resonant is the optical path length L itself. This change is a minuscule re-alignment of the transverse mode to accommodate a cavity length that fits the resonance condition. The wavefront makes the mode, which will readjust itself (a change $\Delta L \ll 2$) to maintain the resonance condition.

Inserting the $\omega$ imposed by the FP in equation (4) gives:

$$L=(M/N)(n_{fpp}/n_{phase})d\cos\theta. \quad (5)$$

Equation (5) can be used in the expression for group delay $$\tau_{rt}=2ngL/c \quad (6)$$

generating:

$$\tau_{rt}=2ngL/c=(M/N)(n_g n_{fpp}/n_{phase})(2d\cos\theta/c) \quad (7)$$

Considering here only the dependence in $\theta$, it is noted that the pump power will change the value of $n_g$, a change that is independent of the angle $\theta$. For the small changes in angle $\theta$ to be considered, M/N=constant=INT(L/d). Therefore, equation (7) simplifies to:

$$\tau_{rt}=2n_g L/c=(n_g n_{fpp}/n_{phase})(2L\cos\theta/c) \quad (8)$$

In this equation, since the laser cavity includes the Fabry-Perot, L itself has an angular dependence:

$$L = L_0 + (n_{fpg}d/\cos\theta) - d\cos(\theta_{out}-\theta)/\cos\theta \quad (9)$$

$$L = L_0 + (n_{fpg}d/\cos\theta) - dn_{fpg}(1-n_{fpp}^2\sin^2\theta)^{1/2} - dn_{fpg}(n_{fpp}\sin^2\theta/\cos\theta)$$

where $L_0$ is the cavity length for normal incidence of the Fabry-Perot. Inserting equation (9) in equation (5), a relationship for the round-trip time difference $\tau_{rt}(\theta)-\tau_{rt}(0)$ is given by:

$$\Delta\tau_{rt}=(n_g n_{fpp}/cn_{phase})\sin^2\theta[4L_0-n_{fpg}d(n_{fpp}-1)]. \quad (10)$$

Figure 5A:
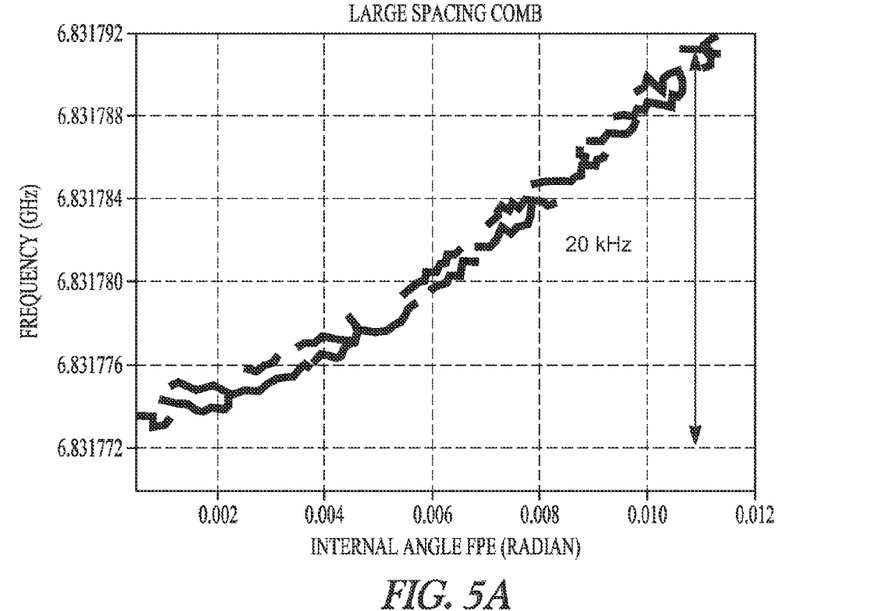
FIGS. 5A-5B show the dependence of the repetition rate on the tilt angle of the Fabry-Perot etalon.
Figure 5B:
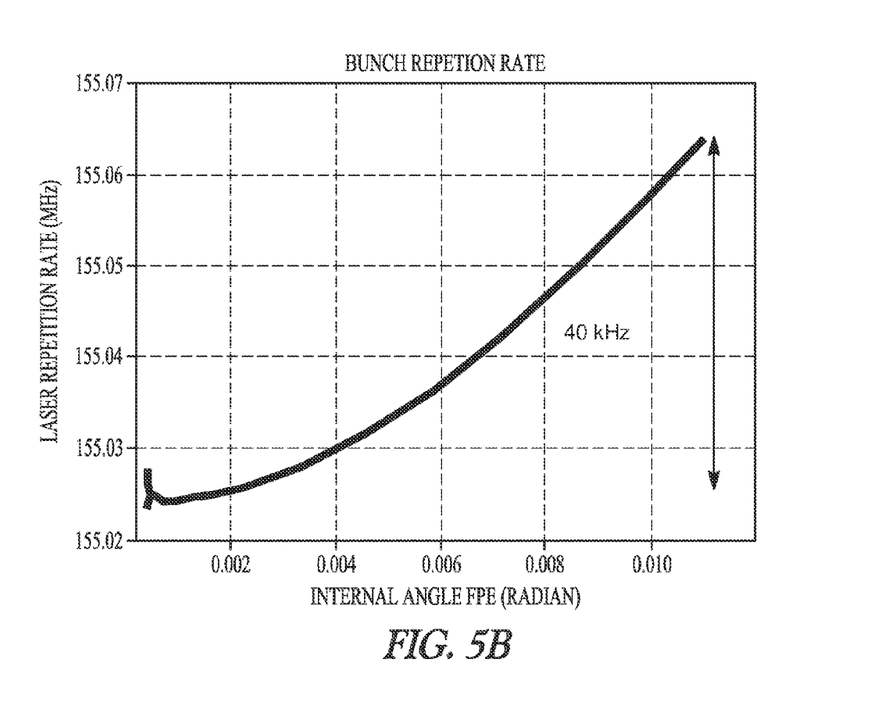

For small angles, this implies a quadratic dependence in the angle $\theta$, as is observed experimentally, as shown in FIGS. 5A-5B. FIGS. 5A-5B show the dependence of the repetition rate on the tilt angle of the Fabry-Perot etalon (internal angle). FIG. 5A shows the high frequency part corresponding to the wide spacing comb in frequency domain. FIG. 5B shows the variation of the repetition rated of the bunch corresponding to the spacing of the sidebands in the frequency domain.

It is clear from the above considerations that the Fabry-Perot etalon controls the frequency of the modes of the Fabry-Perot etalon itself, as well as the frequency of the modes of the laser. This frequency tuning is continuous. When performing experiment of optical pumping of narrow atomic resonances, data of fluorescence versus angle shows repeated resonances, making it appear as if there is a discontinuity in frequency tuning. However, this apparent discontinuity in frequency tuning is incorrect. The mode frequency translates continuously, and the resonance is re-established when a previous mode reaches the frequency of the next mode.

From the above discussions, it has been established that the bunch from the Fabry-Perot etalon repeats itself through the cavity. From the discussion about the dependence of the repetition rate of the bunch on the Fabry-Perot angle, it is clear that the absolute value and the pump power dependence are not related to the Fabry-Perot angle. In other words, there is no set ratio of the repetition rate of the Fabry-Perot cavity and that of the big cavity.

A signal train from a bunch can be defined by $$\tilde{I}(t)\sum_{j=1}^{\infty} I_j e^{ij\omega_{fp}t} = I(t)e^{i\varphi b}\sum_{j=1}^{\infty} I_j e^{ij\omega_{fp}t} \quad (11)$$

I(t) is the equation of the envelope of the bunch. If the modulation of this envelope was a sine wave (as it appeared on photodiode measurements that did not resolve the individual pulses mentioned with respect to FIG. 2), the bunch equation would be simply $I(t)\exp(i\phi_b)\exp(i\omega_{fp}t)$. Because there are pulses under the envelope rather than a sine wave, the train (under the envelope) can be expanded in a Fourier series that contains all the harmonics of index j. The numbers $I_j$ are the coefficients of that Fourier expansion.

This bunch is repeating with delay $\tau_{rt}$ between successive bunches. If the sine wave approximation is used for the bunch:

$$\tilde{I}_{train} = \sum_{q=0}^{\infty} \tilde{I}(t-q\tau_{rt})e^{j\omega_{fp}(t-q\tau_{rt})} \quad (12)$$

$$= e^{i\omega_{fp}t}\sum_{q=0}^{\infty} \tilde{I}(t-q\tau_{rt})e^{-iq\omega_{fp}\tau_{rt}}.$$

There are a few pulses, approximately 14, within the envelope $\tilde{I}$, separated by a period of approximately 148 fs for the above example of uncoated fused-silica FPE can be inserted into a standard titanium-sapphire mode-locked laser cavity. The expression $\omega_{fp}\tau_{rt}=2N\pi-\phi_b$ can be written, where $\phi_b$ is the phase shift between successive bunches. Pulse q=0 has the phase $\phi_{be}$, pulse q=1 has the phase $\phi_{be}-\phi_b$, pulse q=2 has the phase $\phi_{be}-2\phi_b$, and so on. Equation (12) becomes:

$$\tilde{I}_{strain} = e^{i\omega_{fp}t}\sum_{q=0}^{\infty} \tilde{I}(t-q\tau_{rt})e^{-iq(2N\pi-\phi_b)}. \quad (13)$$

The full expansion (11) can be used in discrete Fourier components of the bunch. Equation (13) becomes:

$$\tilde{I}_{strain} = \sum_{j=1}^{\infty} I_j e^{ij\omega_{fp}t}\sum_{j=1}^{\infty} \tilde{I}(t-q\tau_{rt})e^{-iq\omega_{fp}\tau_{rt}}. \quad (14)$$

Consider now the complete discrete Fourier expansion of the bunch. For the $q^{th}$ pulse, delayed by $q\tau_{rt}$, the following is obtained:

$$\tilde{I}_{q,j} = \tilde{I}(\Omega - j\omega_{fp})e^{-iq\tau_{rt}(\Omega - j\omega_{fp})} \quad (15)$$

Summing over q, the infinite series of imaginary exponentials leads to δ-functions:

$$\tilde{I}_{q,j} = \tilde{I}\left(\Omega - j\omega_{fp}\sum_{p=0}^{\infty}\delta\left(\Omega - j\omega_{fp} - \frac{2\pi p}{\tau_{rt}}\right)\right). \quad (16)$$

The comb frequencies are now given by:

$$\Omega = \frac{1}{\tau_{rt}}[2Nj\pi - j\varphi_b + 2p\pi] = \frac{2m\pi - j\varphi_b}{\tau_{rt}}. \quad (17)$$

This means that the first comb j=1 has its teeth given by:

$$\Omega_{m,j=1} = \frac{1}{\tau_{rt}}(\varphi_b + 2m\pi) = f_0 + \frac{2m\pi}{\tau_{rt}}, \quad (18)$$

while for the second comb j=2 the teeth are given by:

$$\Omega_{m,j=2} = \frac{1}{\tau_{rt}}(2\varphi_b + 2m\pi) = 2f_0 + \frac{2m\pi}{\tau_{rt}}. \quad (19)$$

Therefore, the beat comb measured on the spectrum analyzer between successive frequency bunches should indeed be (as observed experimentally): $f_0 + 2m\pi/\tau_{rt}$.

Figure 6:
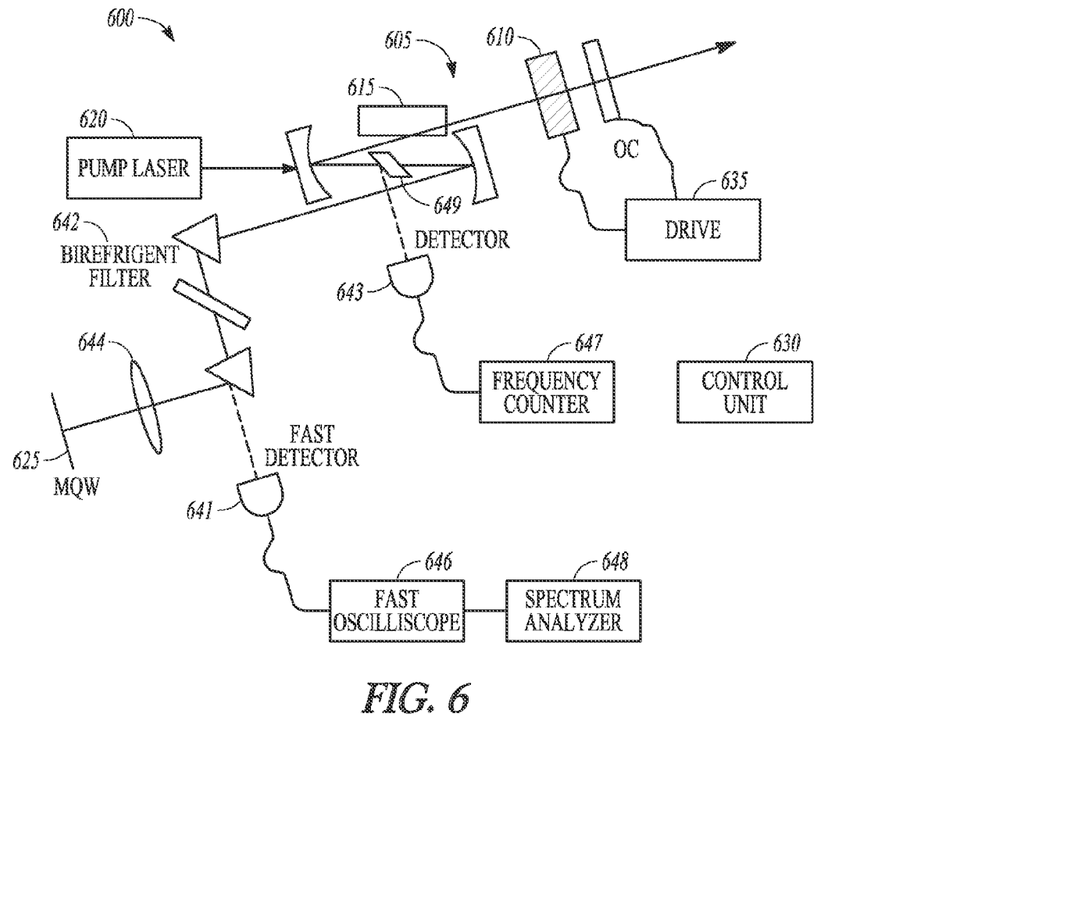
FIG. 6 shows a system having a laser cavity with an intracavity etalon.

FIG. 6 shows a system 600 having a laser cavity 605 having a gain medium 615 with an intracavity etalon 610 disposed in laser cavity 605. The use of components indicated in FIG. 6 may be depend on the application for which system is implemented. System 600 can include a pump laser 620 and a saturable absorber 625 to provide mode-locking. Saturable absorber 625 may be realized by a multiple-quantum-well (MQW). Various optical elements may be implemented including, but not limited to, lens 644, birefringent filter 642, and beam splitter 649, which can also be a surface of the gain crystal. Other components of system 600 may include detectors 641 and 643, frequency counter 647, oscilloscope 646, and spectrum analyzer 648. A drive 635 can include a motor control operable to tilt intracavity etalon 610. In addition, drive 635 may be arranged to move components of system 600 such as one or more mirrors defining laser cavity 605. Drive 635 may be structured as multiple drives corresponding to different components of system 600. System 600 can include a control unit 630 to control components of system 600 in a manner similar to or identical to implementations of controls as discussed herein. Etalon 610 disposed in laser cavity 605 can generate high frequency combs (GHz) from laser cavity 605 without laser cavity 605 being an ultra-short laser cavity. In an embodiment, laser cavity 605 may be about a meter long. Etalon 610 disposed in laser cavity 605 can fine tune the carrier frequency for spectroscopic applications. Coarse tuning can be provided by birefringent filter 642. Fine tuning of the carrier frequency (or the wavelength) refers to a tuning of the optical frequency in the range of MHz to a few GHz. Coarse tuning with the birefringent filter, for example, refers to tuning the wavelength across the optical spectrum (in the order of $10^{15}$ Hz). Intracavity etalon 610 disposed in laser cavity 605 can be used for intracavity pulse shaping and for fine tuning of the laser repetition rate associated with laser cavity 605. Fine tuning of the repetition rate can refer to tuning in the range of 1 Hz to 1 MHz. Coarse tuning of the repetition rate (with cavity length) can refer to tuning in the range of 1 MHz to 500 MHz.

Figure 7:
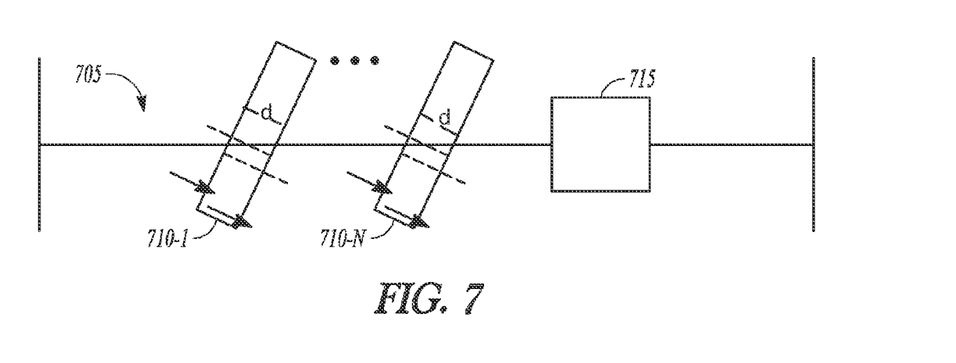
FIG. 7 shows a block diagram of an example embodiment of a laser cavity with multiple intracavity etalons.

The architecture of FIG. 6 can be modified, including using multiple intracavity etalons. As shown in FIG. 7, multiple Fabry-Perot etalons 710-1 . . . 710-N, N being a positive integer, can be disposed in a laser cavity 705 having gain medium 715. Though FIG. 7 shows Fabry-Perot etalons 710-1 . . . 710-N with the same spacing d, Fabry-Perot etalons 710-1 . . . 710-N need have not the same thickness (spacing). In addition, each of Fabry-Perot etalons 710-1 . . . 710-N may be constructed of different materials with different etalon characteristics.

In various embodiments, a system comprises a laser cavity structured to operate as a mode-locked laser cavity and a Fabry-Perot etalon disposed in the laser cavity. The Fabry-Perot etalon disposed in the mode-locked laser cavity provides capability to reach high frequency comb spacing without using an ultra-short laser cavity. For example, a Fabry-Perot etalon in a mode-locked laser cavity can generate high frequency combs in the GHz range in meter long laser cavity having the appropriate gain medium. With a Fabry-Perot etalon added in the mode-locked laser cavity, gain and gain saturation create a pulse train. Because of the gain and gain saturation, the bursts move faster, increasing the repetition rate. Depending on the laser structure, with a Fabry-Perot inserted, change of the repetition rate as function of pump power may be 100 times that of the empty cavity. Also, repetition rate of the laser changes with the Fabry-Perot etalon angle, providing a control mechanism. A Fabry-Perot etalon in a mode locked laser cavity can fine tune the carrier frequency for spectroscopic applications, can be used for intracavity pulse shaping, and can be used for fine tuning of the laser repetition rate, among other things.

The system having a Fabry-Perot etalon disposed in a mode-locked laser cavity can have a number of components and characteristics, realized either independently or with various permutations of such components and characteristics. The system can include a driver to set a tilt angle of the Fabry-Perot etalon, the tilt angle being referenced to a propagation axis of the laser cavity. The system can include a control unit coupled to the driver, where the control unit is operable to tilt the Fabry-Perot etalon such that a laser repetition rate of a laser formed by the laser cavity and the Fabry-Perot etalon can be tuned. The Fabry-Perot etalon can be selected to have a thickness correlated to provide a tuning of a frequency, the frequency corresponding to a frequency of a laser corresponding to the laser cavity without the Fabry-Perot etalon. The system can have a gain control to adjust laser gain such that a repetition rate of a laser corresponding to the laser cavity without the Fabry-Perot etalon can be tuned. The gain control can regulate pump power of a pump laser to the laser cavity having the Fabry-Perot etalon disposed therein. The gain control can include an electro-optic attenuator. The system can be structured to provide tuning of a repetition rate of a laser corresponding to the laser cavity without the Fabry-Perot etalon based a laser cavity length of the laser cavity. The system can include a drive control to adjust one or more ends of the laser cavity. The system can include the Fabry-Perot etalon structured with faces having a reflectivity selected to generate a specific number of pulses in a high frequency burst from the laser cavity. The system can include one or more additional Fabry-Perot etalons disposed in the laser cavity. The system can include a drive control to adjust spacing of the Fabry-Perot etalon, depending on the type of Fabry-Perot etalon implemented.

In various embodiments, features of an example method can comprise generating high frequency comb structures from a mode-locked laser, where the mode-locked laser has a laser cavity in which a Fabry-Perot etalon is disposed. Variations of the method using a Fabry-Perot etalon disposed in a mode-locked laser cavity can include use of a number of components, characteristics, and processes, realized either independently or with various permutations of such components, characteristics, and processes. With the inserted Fabry-Perot etalon, coupled comb structures can be generated in a single laser cavity. The laser cavity can have a length of a meter. The method can include tilting the Fabry-Perot etalon to tune the carrier frequency. The method can include generating the high frequency comb structures in a spectroscopic application. The method can include adjusting the Fabry-Perot etalon to provide intracavity pulse shaping. The method can include adjusting spacing of the Fabry-Perot etalon, providing tuning of the frequency of the mode-locked laser, depending on the type of Fabry-Perot etalon used. The method can include tilting the Fabry-Perot etalon, providing a tuning of a laser repetition rate of the mode-locked laser. The method can include adjusting laser gain such that a repetition rate associated with the mode-locked laser without the Fabry-Perot is tuned. Adjusting laser gain can include controlling pump power to a pump laser. Adjusting laser gain can include using an electro-optic attenuator. The method can include adjusting a laser cavity length of the laser cavity to tune a repetition rate associated with the mode-locked laser. The method can include adjusting spacing of the Fabry-Perot etalon to tune a repetition rate associated with mode-locked laser.

Although specific embodiments have been illustrated and described herein, it will be appreciated by those of ordinary skill in the art that any arrangement that is calculated to achieve the same purpose may be substituted for the specific embodiments shown. Upon studying the disclosure, it will be apparent to those skilled in the art that various modifications and variations can be made in the devices and methods of various embodiments of the invention. Various embodiments can use permutations and/or combinations of embodiments described herein. Other embodiments will be apparent to those skilled in the art from consideration of the specification and practice of the embodiments disclosed herein. It is to be understood that the above description is intended to be illustrative, and not restrictive, and that the phraseology or terminology employed herein is for the purpose of description.

What is claimed is:

1. A system comprising:
   a laser cavity structured to operate as a mode-locked laser cavity; and
   a Fabry-Perot etalon disposed in the laser cavity, wherein length of the laser cavity and thickness of the Fabry-Perot etalon are arranged such that, at each round trip of a signal in the laser cavity, a bunch of pulses is formed by interferences, providing multiple combs.

2. The system of claim 1, wherein the system includes a driver to set a tilt angle of the Fabry-Perot etalon, the tilt angle being referenced to a propagation axis of the laser cavity.

3. The system of claim 2, wherein the system includes a control unit coupled to the driver, the control unit operable to tilt the Fabry-Perot etalon such that a laser repetition rate of a laser formed by the laser cavity and the Fabry-Perot etalon can be tuned.

4. The system of claim 1, wherein the system has a gain control to adjust laser gain such that a repetition rate of a laser corresponding to the laser cavity with the Fabry-Perot etalon can be tuned.

5. The system of claim 4, wherein the gain control is operable to increase the repetition rate of the laser cavity having the Fabry-Perot etalon disposed therein by orders of magnitude compared to the laser cavity without having the Fabry-Perot etalon disposed therein.

6. The system of claim 4, wherein the gain control includes an electro-optic attenuator.

7. The system of claim 1, wherein the system is structured to provide tuning of a repetition rate of a laser corresponding to the laser cavity without the Fabry-Perot etalon based on a laser cavity length of the laser cavity.

8. The system of claim 7, wherein the system includes a drive control to adjust one or more ends of the laser cavity.

9. The system of claim 1, wherein the system includes the Fabry-Perot interferences structured to generate a specific number of pulses in a high frequency burst from the laser cavity.

10. The system of claim 1, wherein system includes one or more additional Fabry-Perot etalons disposed in the laser cavity.

11. The system of claim 1, wherein the system includes a drive control to adjust the thickness of the Fabry-Perot etalon.

12. A method comprising:
    generating multiple frequency combs from a mode-locked laser, the mode-locked laser having a laser cavity in which a Fabry-Perot etalon is disposed such that length of the laser cavity and thickness of the Fabry-Perot etalon are arranged such that, at each routine round trip of a signal in the laser cavity, a bunch of pulses is formed by interferences, providing the multiple frequency combs.

13. The method of claim 12, wherein the laser cavity has a length of a meter.

14. The method of claim 12, wherein the method includes tilting the Fabry-Perot etalon to tune the carrier frequency of the mode-locked laser.

15. The method of claim 12, wherein generating multiple frequency combs includes generating two frequency combs such that a high frequency comb relative to the other frequency comb is generated in a spectroscopic application.

16. The method of claim 12, wherein the method includes adjusting the Fabry-Perot etalon to provide intracavity pulse shaping.

17. The method of claim 12, wherein the method includes adjusting the thickness of the Fabry-Perot etalon in generating two frequency combs, providing tuning of a high frequency comb, relative to the other frequency comb, of the mode-locked laser.

18. The method of claim 12, wherein the method includes tilting the Fabry-Perot etalon, providing a tuning of a laser repetition rate of the mode-locked laser.

19. The method of claim 12, wherein the method includes adjusting laser gain such that a repetition rate associated with the mode-locked laser without the Fabry-Perot is tuned.

20. The method of claim 19, wherein adjusting laser gain includes controlling pump power to a pump laser.

21. The method of claim 19, wherein adjusting laser gain includes using an electro-optic attenuator.

22. The method of claim 12, wherein the method includes adjusting a laser cavity length of the laser cavity to tune a repetition rate associated with the mode-locked laser.

23. The method of claim 12, wherein the method includes adjusting the thickness of the Fabry-Perot etalon to tune a repetition rate associated with the mode-locked laser.

24. The method of claim 12, wherein the method includes adjusting laser gain such that a repetition rate associated with the mode-locked laser is tuned over a larger range by including the Fabry-Perot.

* * * * *